US011415378B2

(12) United States Patent
Ranjan et al.

(10) Patent No.: US 11,415,378 B2
(45) Date of Patent: Aug. 16, 2022

(54) INLET HEADER DUCT DESIGN FEATURES

(71) Applicant: Hamilton Sundstrand Corporation, Charlotte, NC (US)

(72) Inventors: Ram Ranjan, West Hartford, CT (US); Brian St. Rock, Andover, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 30 days.

(21) Appl. No.: 17/076,222

(22) Filed: Oct. 21, 2020

(65) Prior Publication Data

US 2021/0033355 A1 Feb. 4, 2021

Related U.S. Application Data

(63) Continuation of application No. 15/923,614, filed on Mar. 16, 2018, now Pat. No. 10,845,135.

(51) Int. Cl.
*F28F 9/22* (2006.01)
*B23P 15/26* (2006.01)
*F28F 9/02* (2006.01)

(52) U.S. Cl.
CPC ............... *F28F 9/22* (2013.01); *B23P 15/26* (2013.01); *F28F 9/0263* (2013.01); *F28F 2009/029* (2013.01); *F28F 2009/222* (2013.01); *F28F 2009/226* (2013.01)

(58) Field of Classification Search
CPC .......... F28F 9/22; F28F 9/0263; F28F 9/0265; F28F 2009/222; F28F 2009/226; B23P 15/26
USPC ......................................................... 165/143
See application file for complete search history.

(56) References Cited

U.S. PATENT DOCUMENTS

| 5,351,751 | A | 10/1994 | Cage et al. |
| 6,116,335 | A | 9/2000 | Beamer et al. |
| 6,845,813 | B1 | 1/2005 | Knight et al. |
| 7,121,329 | B2 | 10/2006 | Shields et al. |
| 9,328,968 | B2 | 5/2016 | Vanderwees |
| 10,240,874 | B2 | 3/2019 | Singh |
| 2007/0187080 | A1 | 8/2007 | Sonoda et al. |
| 2013/0025838 | A1 | 1/2013 | Kato et al. |
| 2015/0211812 | A1 | 7/2015 | Goenka et al. |
| 2016/0231068 | A1 | 8/2016 | Schmitz et al. |

(Continued)

FOREIGN PATENT DOCUMENTS

| DE | 102015219653 A1 * | 4/2016 | ............ F02B 29/045 |
| EP | 1574802 A2 | 9/2005 | |

(Continued)

OTHER PUBLICATIONS

Extended European Search Report for EP Application No. 19162348. 7, dated Aug. 2, 2019, pp. 7.

*Primary Examiner* — Tho V Duong
(74) *Attorney, Agent, or Firm* — Kinney & Lange, P. A.

(57) ABSTRACT

A header duct and method of forming a header duct includes an inlet portion having a planar inlet, an outlet portion have a plurality of planar outlets, and a transition portion extending continuously from the inlet portion to the outlet portion. The transition portion has a bend and internal topography defining a non-monotonic cross-sectional area distribution between the inlet and outlet portions. The transition portion can further include a bulbous region extending in a lateral direction of the duct and a protrusion located along an inside radius of the bend.

7 Claims, 10 Drawing Sheets

(56) References Cited

U.S. PATENT DOCUMENTS

| | | |
|---|---|---|
| 2017/0081031 A1 | 3/2017 | Bammann et al. |
| 2017/0146305 A1 | 5/2017 | Kuczek et al. |
| 2017/0211896 A1 | 7/2017 | Schwalm et al. |
| 2017/0335690 A1 | 11/2017 | Golan et al. |

FOREIGN PATENT DOCUMENTS

| | | | | |
|---|---|---|---|---|
| EP | 2562507 A1 | | 2/2013 | |
| FR | 1291617 A | | 4/1962 | |
| JP | S59137795 A | | 8/1984 | |
| JP | S62156287 U | | 10/1987 | |
| JP | 2002310593 A | | 10/2002 | |
| JP | 2012241627 A | * | 12/2012 | ............ F28F 9/0263 |
| WO | WO9911421 A1 | | 3/1999 | |
| WO | WO2014010675 A1 | | 1/2014 | |

* cited by examiner

INLET HEADER DUCT DESIGN FEATURES

CROSS-REFERENCE TO RELATED APPLICATION(S)

This application is a continuation of U.S. application Ser. No. 15/923,614, filed Mar. 16, 2018, for "INLET HEADER DUCT DESIGN FEATURES", by Ram Ranjan et. al.

BACKGROUND

The present invention relates to header ducts and, more particularly, to internal topography of header ducts.

A header duct is a component shaped to distribute fluid from a source to a component attached to the header duct outlet. In some instances, the header duct forms a manifold whereby fluid from a single source is distributed among multiple outlets.

Figure 1A:
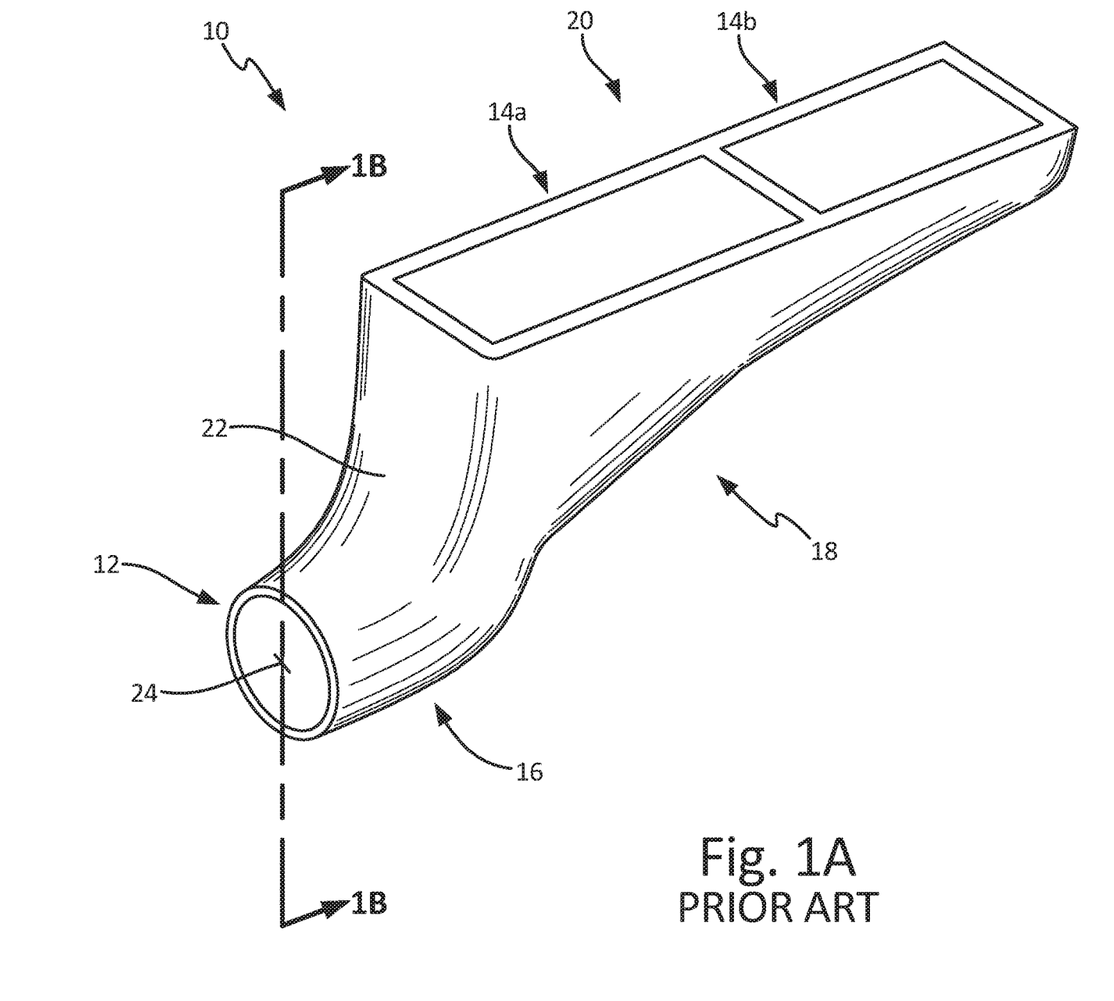
FIG. 1A is an isometric view of a prior art header duct having a single inlet and multiple outlets.

For example, FIG. 1A depicts prior art duct 10 that distributes fluid received through inlet 12 to first outlet 14a and second outlet 14b. Duct 10 includes inlet portion 16, transition portion 18, and outlet portion 20. Inlet portion 16 extends from inlet 12 to transition portion 18, and outlet portion 20 extends from transition portion 18 to first and second outlets 14a, 14b. Transition portion 18 extends between inlet portion 16 and outlet portion 20 and is encompassed by bend 22, which permits an inlet plane containing inlet 12 to be angularly offset with respect to an outlet plane containing first outlet 14a and second outlet 14b. Furthermore, transition portion 18 has walls forming a distribution of cross-sectional areas that transition from a circular cross-sectional area that is continuous with inlet portion 16 to a rectangular cross-sectional area that is continuous with outlet portion 20.

Figure 1B:
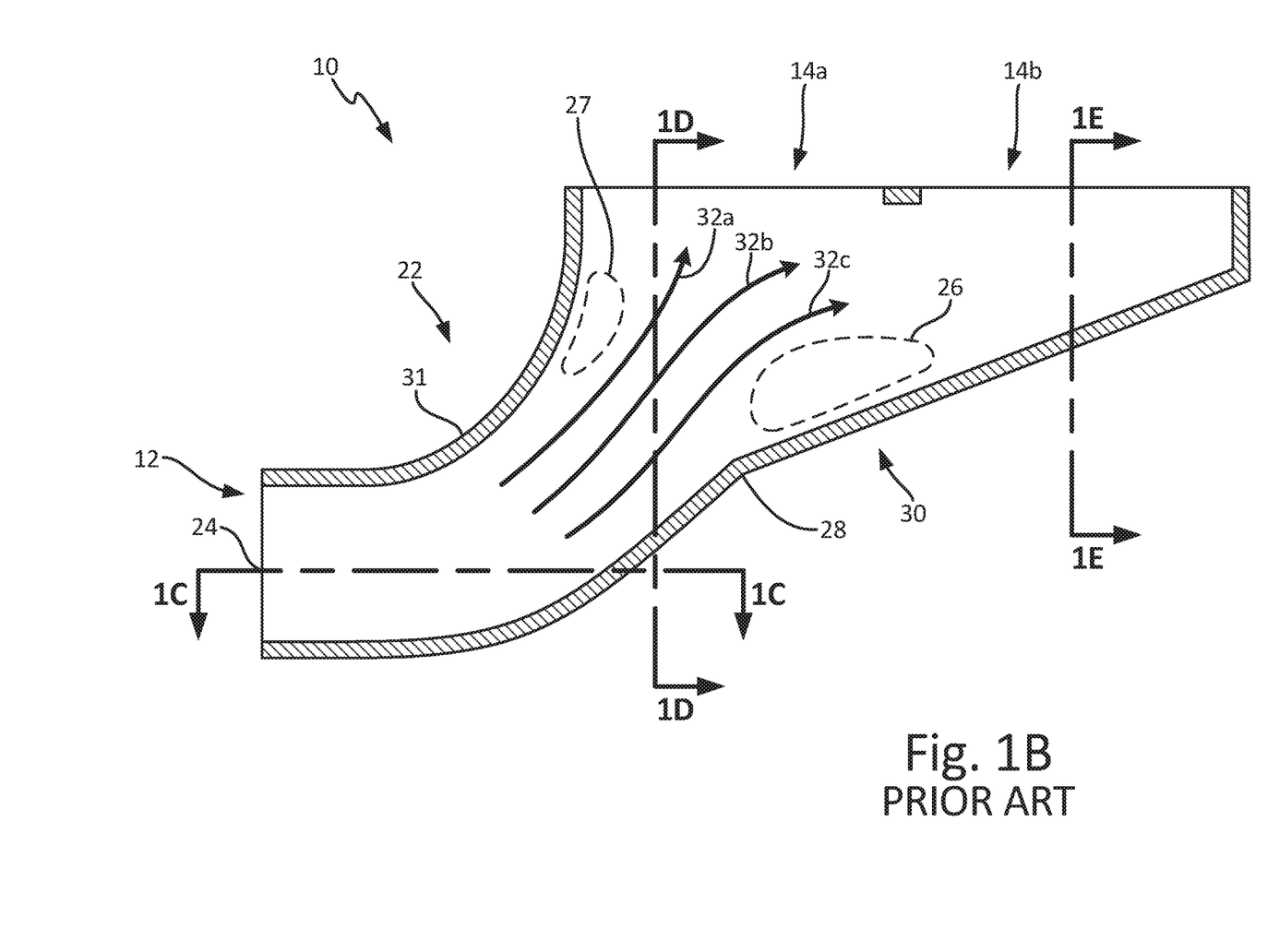
FIG. 1B is a cross-sectional view of the prior art duct depicted in FIG. 1A taken through an inlet center point.
Figure 1C:
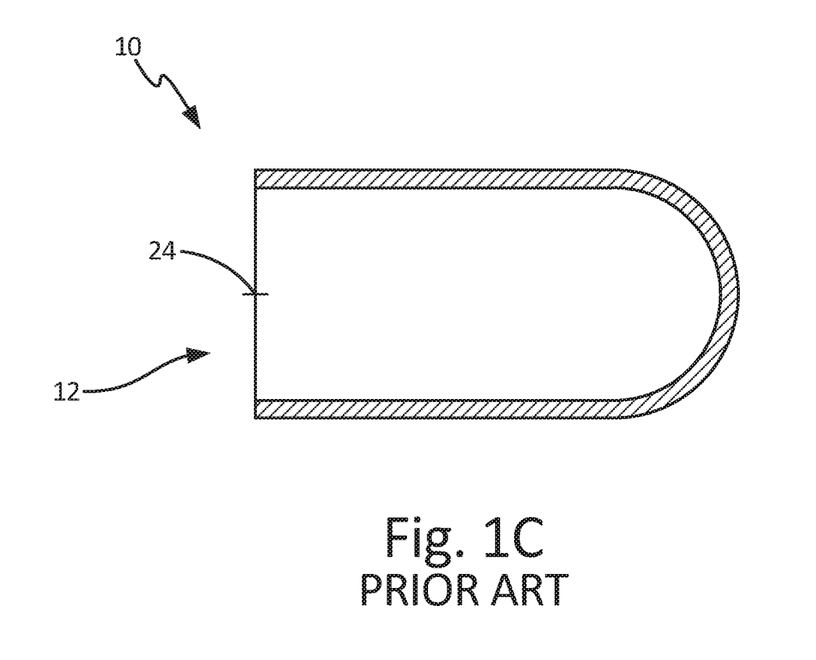
FIG. 1C is a cross-sectional view of the prior art duct depicted in FIG. 1A taken along line 1C-1C and intersecting the duct inlet.
Figure 1D:
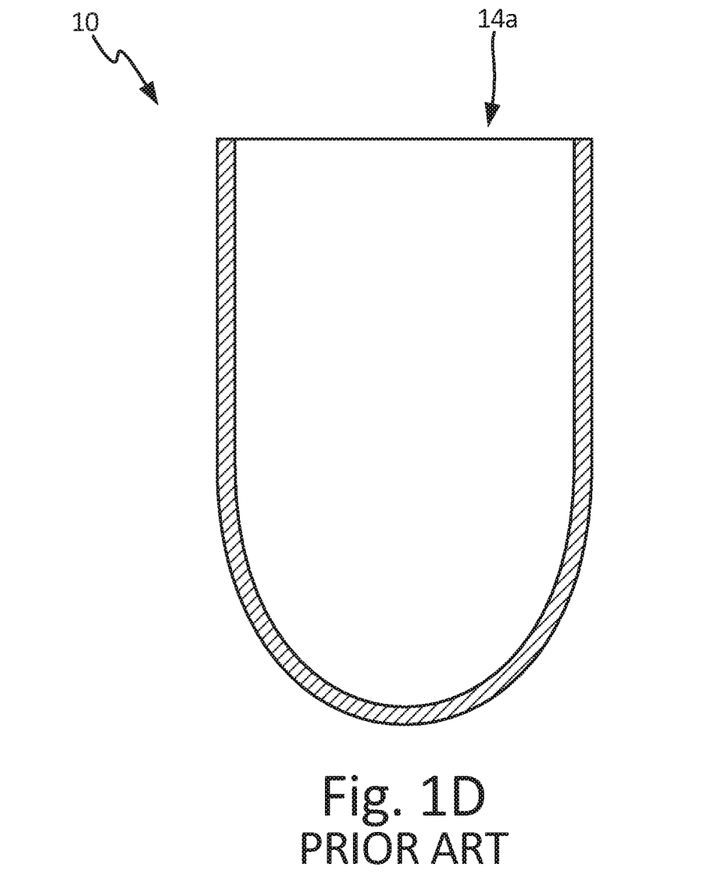
FIG. 1D is a cross-section view of the prior art duct depicted in FIG. 1A taken along line 1D-1D and intersecting a first duct outlet.
Figure 1E:
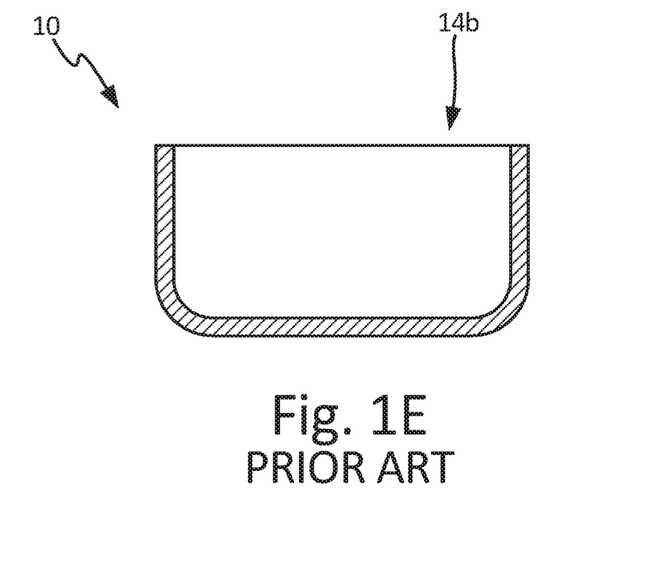
FIG. 1E is a cross-section view of the prior art duct depicted in FIG. 1A taken along line 1E-1E and intersecting a second duct outlet.

FIG. 1B is a cross-sectional view of duct 10 taken along line 1B-1B in FIG. 1A in which line 1B-1B is coincident with center point 24 of inlet 12. FIGS. 1C, 1D, and 1E are additional cross-sectional views taken along lines 1C-1C, 1D-1D, and 1E-1E shown in FIG. 1B, respectively. As generally shown by FIGS. 1B, 1C, 1D and 1E, transition portion 18 has walls that are generally characterized by a simple, monotonic transition between the circular cross-section of inlet 12 to the rectangular cross-section of outlet portion 20. Headers such as duct 10 are designed using computer-aided-design (CAD) or a CAD-driven process in which designers are primarily concerned with the physical constraints of duct 10.

While duct 10 provides outlets 14a and 14b with fluid from inlet 12, headers designed with such CAD-driven processes fail to consider the fluid flow dynamics within duct 10 and result in unnecessarily high pressure loss through the duct due to flow separation regions, which create a region of turbulent flow and effectively reduce the cross-sectional area of duct 10 near the separation region. For instance, as shown in FIG. 1B, flow separation region 26 results from bend 28 along outside radius duct wall 30, and flow separation region 27 region results from bend 28 along inside radius duct wall 31. Consequently, flow lines 32a, 32b, and 32c are diverted away from regions 26 and 27, increasing the pressure loss and reducing flow uniformity through duct 10.

Increased pressure loss and reduced flow uniformity decrease performance of components (e.g., one or more heat exchangers) which utilize fluid delivered through first outlet 14a and second outlet 14b. The total pressure loss through a system must not exceed the driving pressure by some margin in order to achieve a design flow rate through the system. For example, header duct 10 may supply one or more heat exchangers connected to first outlet 14a and second outlet 14b. Increased pressure loss in header duct 10 limits the allowable pressure loss through the heat exchangers and, thus, limits the overall size or passage geometry of the heat exchangers. Moreover, non-uniform flow distributions through duct 10 concentrate flow through some passages of the heat exchanger and reduce flow through other heat exchanger passages, thereby reducing the efficiency of the heat exchanger as well as creating unnecessary pressure losses due to the concentrated flow passages.

Accordingly, because duct manufactures continue to seek improved header duct performance, a need exists for a header duct that further eliminates or reduces pressure losses due to flow separation and improves flow uniformity.

SUMMARY

A header duct includes an inlet portion having a planar inlet, an outlet portion having multiple planar outlets, and a transition portion extending continuously from the inlet portion to the outlet portion and defining a bend, making the outlets non-parallel with the inlet. The transition portion further includes internal topography defining a non-monotonic cross-sectional area distribution between the inlet and outlet portions.

In a further embodiment of the header duct, the internal topography of the transition portion may define a bulbous, intermediate region and a protrusion along an inside radius of the bend. The bulbous region has a larger cross-sectional area than a cross-sectional area of the inlet measured along a first intermediate plane parallel to and offset from the inlet. The bulbous region further includes a convex curvature adjacent the inlet portion that smoothly transitions to a concave curvature within the bulbous region along a second intermediate plane perpendicular to the first intermediate plane and intersecting the inlet. Lateral walls of the bulbous region further include a concave curvature that converges towards a lateral dimension of the outlets.

A method of forming a header duct includes forming an inlet portion that extends from a circular inlet, forming an outlet portion with a plurality of rectangular outlets, and forming a transition portion joining the inlet portion to the outlet portion. Forming the transition portion includes forming internal topography that defines a non-monotonic cross-sectional area distribution between the inlet portion and the outlet portion. The method can further include forming a bulbous region defined by the internal topography that extends laterally away from a plane intersecting a center point of the inlet and extending perpendicularly away from the inlet along a longitudinal direction of the outlets.

DETAILED DESCRIPTION

Figure 2A:
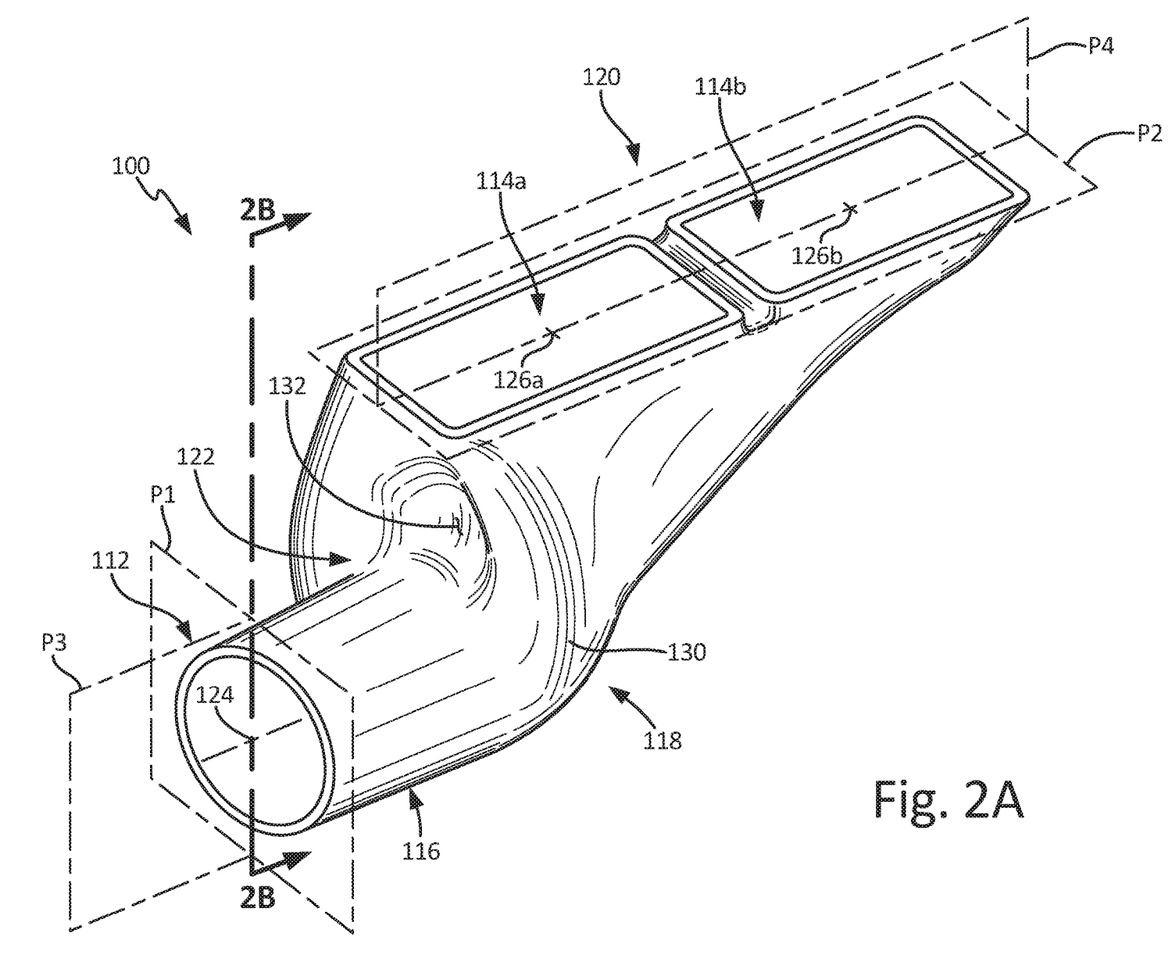
FIG. 2A is an isometric view of a header duct having features for reducing or eliminating flow separation and pressure loss as well as improving flow uniformity.

FIG. 2A is an isometric view of header duct 100 extending from inlet 112 to first and second outlets 114a and 114b. Duct 100 includes inlet portion 116 extending from inlet 112 to transition portion 118 and outlet portion 120 extending from transition portion 118 to outlets 114a and 114b. Inlet 112 is contained within plane P1 and has a circular cross-sectional area. Outlets 114a and 114b are contained within plane P2 and have rectangular cross-sectional areas in which a longitudinal direction of outlets 114a and 114b extends away from plane P1 along a lengthwise dimension of outlets 114a and 114b. Accordingly, header duct 100 includes bend 122, which as shown in FIG. 2A, facilitates a 90-degree angular change between plane P1 of inlet 112 and plane P2 of outlets 114a and 114b. However, even though FIG. 2A depicts a 90-degree bend, bend 122 can have any angular change measured between planes P1 and P2 that is greater than 0 degrees and less than or equal to 90 degrees.

In addition to being angularly offset, outlets 114a and 114b can be laterally offset from inlet 112 as depicted in FIG. 2A and described in reference to planes P3 and P4 as follows. Inlet 112 includes center point 124 located at the geometric center of inlet 112, and outlets 114a and 114b have center points 126a and 126b, each located at the geometric center of the respective outlets 114a and 114b. Plane P3 passes through inlet center point 124 and extends perpendicularly from inlet 112 and plane P1. Plane P4 passes through outlet center points 126a and 126b and extends perpendicularly from plane P3 as well as outlets 114a and 114b. The lateral offset of outlets 114a and 114b from inlet 112 results in plane P4 extending parallel to and offset from plane P3. In other embodiments of duct 100, inlet center point 124 is coplanar with outlet center points 126a and 126b. As such, duct 100 can be configured without a lateral offset between inlet 112 and outlets 114a and 114b.

Transition portion 118 encompasses bend 122 and includes portions of duct 100 that transition from a constant cross-sectional shape of inlet portion 116 to a constant cross-sectional shape of outlet port 120 that is different than the inlet portion 118 to form a continuous transition from inlet portion 116 to outlet portion 120. While the cross-sectional shapes of inlet portion 116 and outlet portion 120 are constant, inlet portion 116 and outlet portion 120 may have converging or diverging walls that increase or decrease the cross-sectional area of inlet portion 116 and outlet portion 120.

Internal topography 128 of transition portion 118 (see FIGS. 2B, 2C and 2D) defines a cross-sectional area distribution that is non-monotonic. In particular, transition region 118 includes at least one of bulbous intermediate region 130 and protrusion 132 that extends into an interior of duct 100. Embodiments with bulbous region 130 have walls that extend laterally away from plane P3 within an intermediate region of transition portion 118. Protrusion 132 is located on an inside radius of bend 122 and is between inlet portion 116 and outlet portion 120.

Figure 2B:
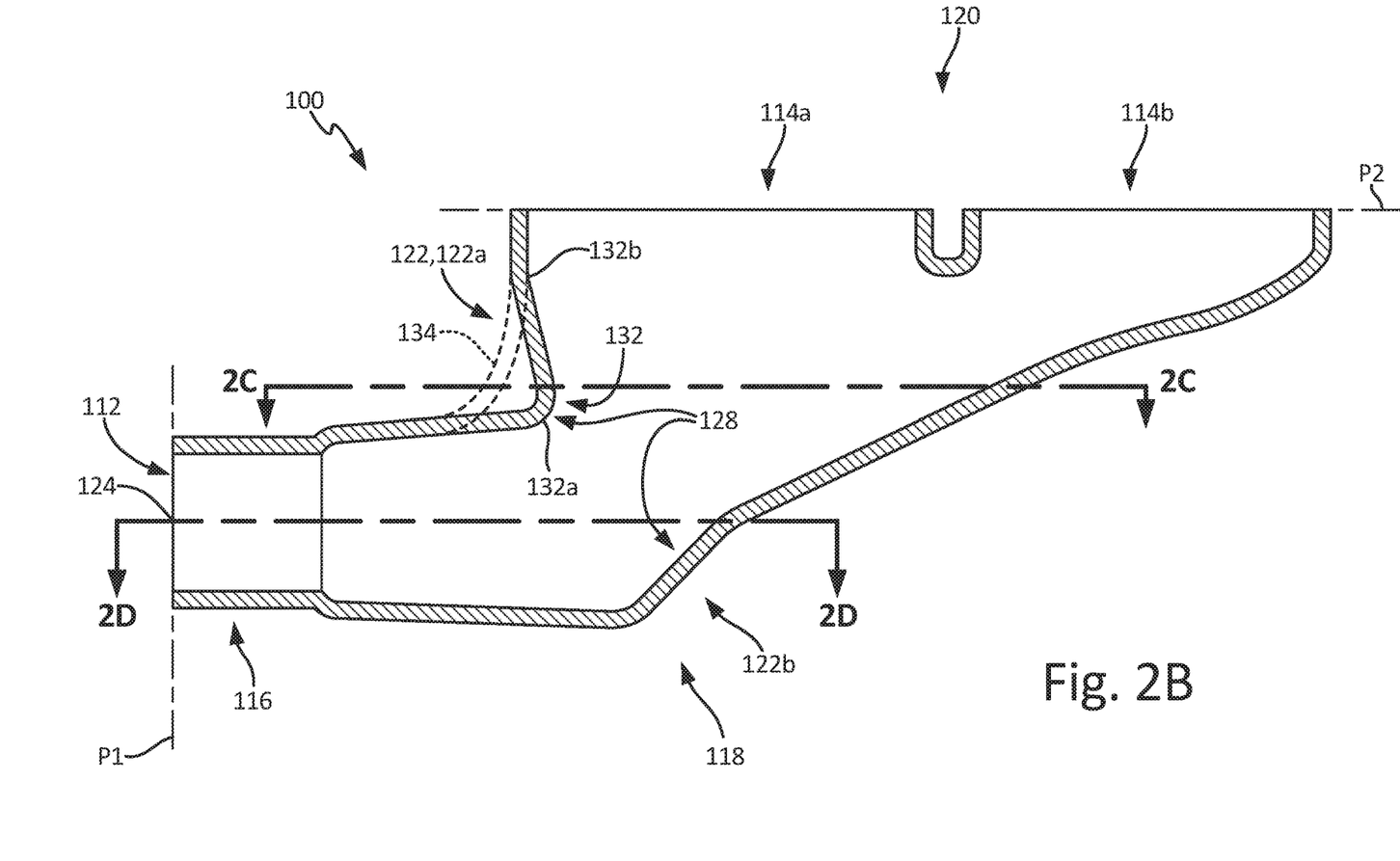
FIG. 2B is a cross-sectional view of the header duct of FIG. 2A taken along line 2B-2B.

FIG. 2B is a cross-sectional view of header duct 100 taken along line 2B-2B formed by the intersection between planes P1 and P3. Protrusion 132 is continuous with and tangent to walls of inlet and outlet portions 116 and 120, which is shown relative to a constant radius bend (shown as dashed line 134). When viewed in plane P3, protrusion 132 extends inward from inside radius 122a of bend 122, inside radius 122a having a smaller turn radius than outside radius 122b of bend 122. Accordingly, protrusion 132 extends further into an interior of duct 100 that a constant radius bend 134 and forms convex curvature 132a proximate inlet portion 116 that transitions to concave curvature 132b proximate outlet portion 120. The transition from convex curvature 132a to concave curvature 132b occurs along a direction of flow from inlet 112 to outlets 114a and 114b.

Additionally, inlet portion 116 can have walls defining a constant cross-sectional area distribution or, as shown in FIG. 2B, walls of inlet portion 116 can diverge along a direction extending away from inlet 112 towards transition 118. While FIG. 2B shows diverging inlet walls as viewed along plane P3, walls of inlet portion 116 can also be diverging in a laterally-oriented plane as necessary for inlet portion 116 to be continuous with bulbous region 130 of transition portion 118.

Figure 2C:
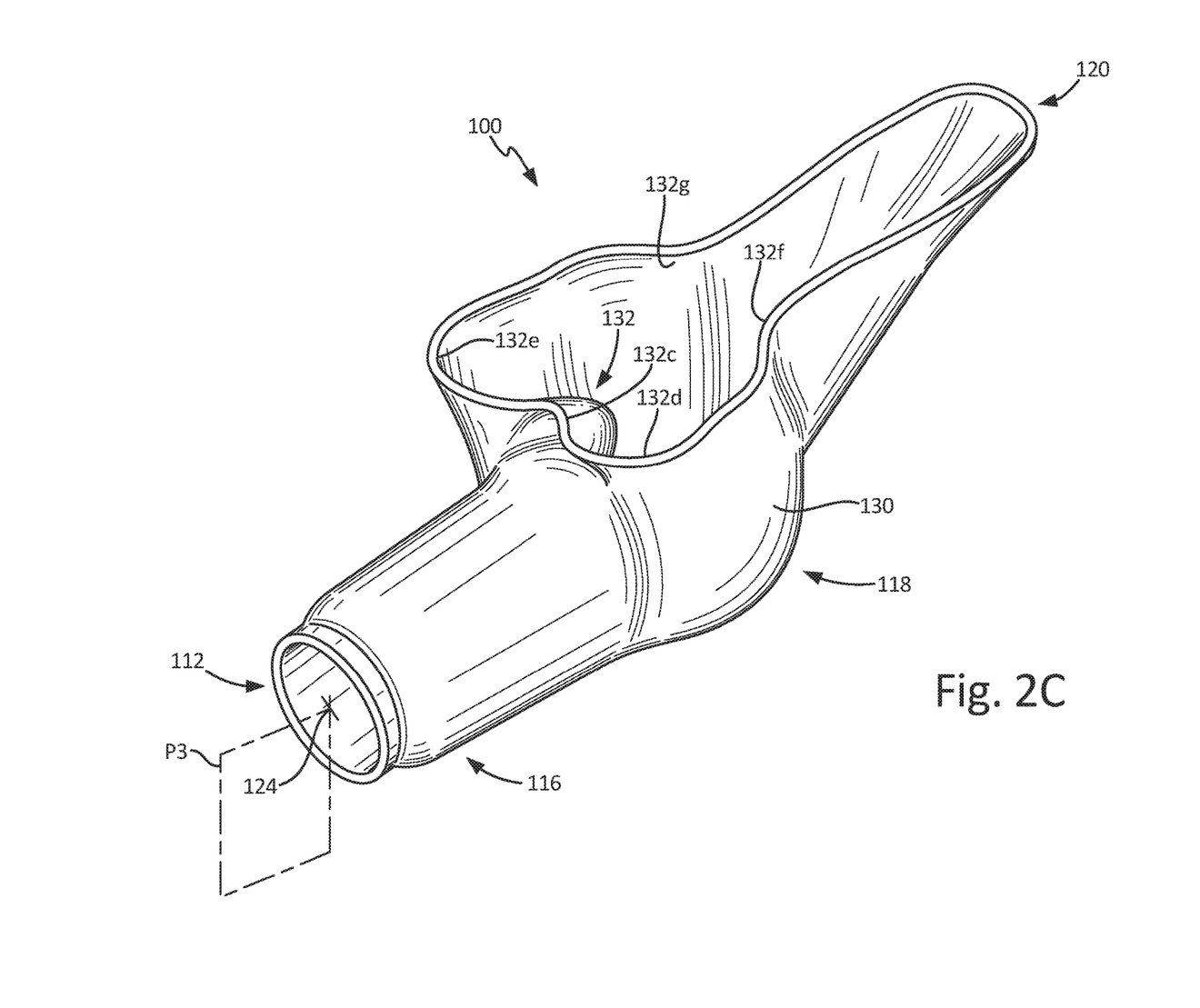
FIG. 2C is a cross-sectional view of the header duct of FIG. 2A taken along line 2C-2C showing a protrusion positioned along an inside bend radius and additional internal topography of header duct.

FIG. 2C is an isometric sectional view of header duct 100 taken along line 2C-2C that is parallel to plane P2 and shows an additional view of protrusion 132 formed by internal topography 128. Along a lateral direction extending away from plane P3, protrusion 132 forms convex curvature 132c disposed between concave curvatures 132d and 132e or depressions. In some embodiments, convex curvature 132c is centrally disposed between convex curvatures 132d and 132e, being bisected by plane P3. Extending away from inlet 112 along the sectional plane of FIG. 2C, internal topography transitions from concave curvatures 132d and 132e to convex curvatures 132f and 132g, respectively, before joining walls of outlet portion 120. The curvature distribution of protrusion 132 depicted by FIG. 2C is representative of other cross-sectional views taken parallel to section 2C-2C and offset towards or away from outlets 114a and 114b, albeit with a higher or lesser degree of curvature. In particular, as internal topography 128 extends from section 2C-2C towards outlets 114a and 114b, the radii of curvature for curvatures 132c, 132d, and 132e increase and approach the curvature of outlet portion 120.

Protrusion 132 extends into a region that would form a flow separation region (e.g., flow separation region 27 associated with duct 10 shown in FIG. 1B) if duct 100 where to be formed with constant radius bend 134. However, unlike the prior art ducts, protrusion 132 closely follows a streamline of fluid flowing from inlet 112 to outlets 114a and 114b, and, in particular, closely follows a streamline of a portion of fluid flowing to outlet 114a, which is disposed closer to bend 122 than outlet 114b. Therefore, duct 100 configured with protrusion 132 reduces or eliminates a region of flow separation proximate inside bend radius 122a and thereby reduces pressure drop through duct 100.

Moreover, FIGS. 2B and 2C depict protrusion 132 as being integrally formed, or formed at the same time as transition portion 118 and as a single piece. However, protrusion 132 may also be formed as a separate, discrete piece and joined later to transition portion 118. In some embodiments, protrusion 132 may be formed from sheet metal, which can be welded, brazed, or joined using some other suitable mechanical means. For instance, protrusion 132 can have pre-formed holes that correspond to a pattern of mating holes formed through a wall of transition portion 118. After aligning the holes of protrusion 132 with the holes of transition portion 118, rivets secured through the hole patterns can be used to attach protrusion 132 to transition portion 118. In other embodiments, protrusion 132 can be formed using an additive manufacturing process in lieu of sheet metal.

Figure 2D:
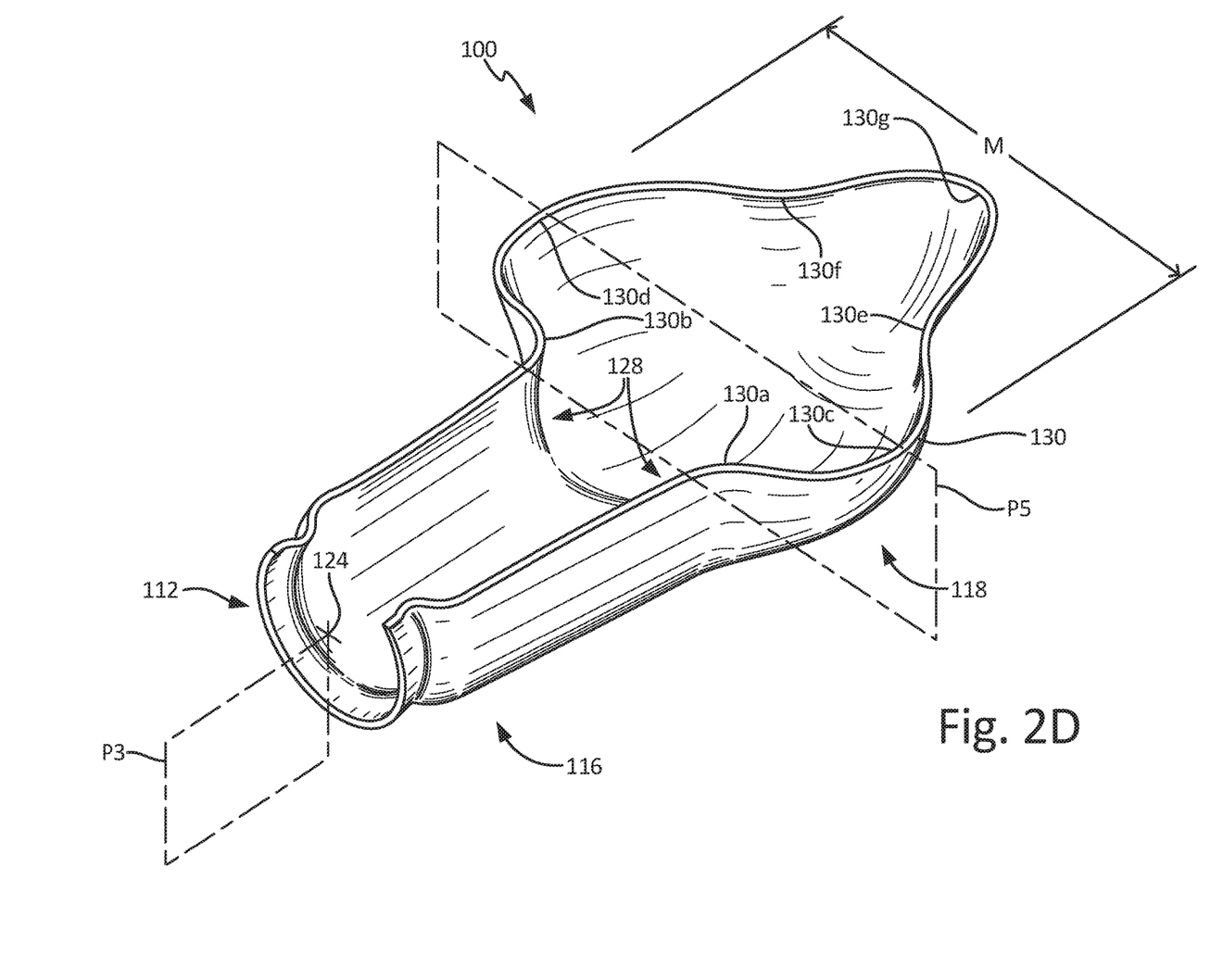
FIG. 2D is a cross-sectional view of the header duct of FIG. 2A taken along line 2D-2D showing a bulbous region within a transition portion of the header duct.

FIG. 2D is an isometric sectional view of header duct 100 taken along line 2D-2D, which intersects inlet 112 and is parallel to outlets 114a and 114b. FIG. 2D depicts bulbous region 130 within an intermediate region of transition portion 118 in which bulbous region 130 is defined by internal topography 128 that extends laterally away from plane P3. Within the FIG. 2D sectional plane and in a direction extending away from inlet portion 116 and towards transition portion 118, bulbous region 130 includes convex curvatures 130a and 130b on opposing lateral sides of transition portion 118 that transition to concave curvatures 130c and 130d, respectively. Extending further away from inlet 112, concave curvatures 130c and 130d transition to convex curvatures 130e and 130f, respectively. Laterally opposing convex curvatures 130e and 130f are joined by concave curvature 130g. Bulbous region 130 creates an intermediate region in which a cross-sectional area taken through bulbous region 130 is larger than a cross-sectional area of inlet 112 in which the cross-sectional area of bulbous region 130 is measured within intermediate plane P5. Plane P5 intersects bulbous region 130 and is parallel to and offset from plane P1 containing inlet 112 such that plane P5 extends laterally between concave curvatures 130c and 130d. In some embodiments, maximum lateral dimension M of duct 100 is within plane P5.

The cross-sectional view of FIG. 2D is representative of features of bulbous region 130 taken through other sectional views parallel to and offset from sectional view FIG. 2D. Views taken parallel to and offset towards outlets 114a and 114ba approach the curvature of outlet portion 120. In some embodiments, this trend produces lateral sides of bulbous region 130 that converge towards a lateral dimension of outlets 114a and 114b. Views taken parallel to and offset away from outlets 114a, 114b have curvature profiles in which radii of curvature increase until opposing lateral sides join at an end of duct 100 opposite outlets 114a and 114b.

Figure 2E:
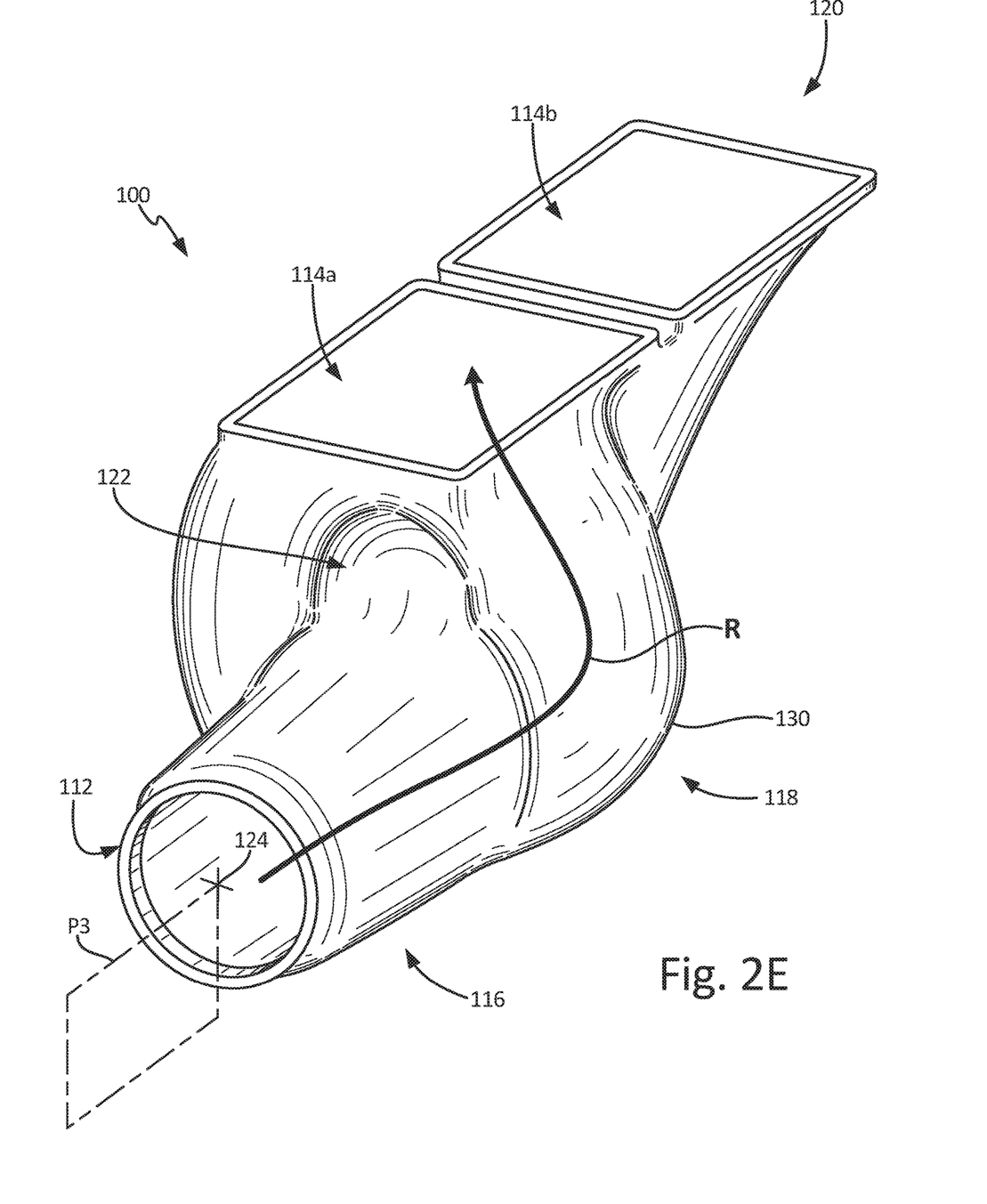
FIG. 2E is an isometric view of the header duct of FIG. 2A showing the effective bend radius resulting from the bulbous region depicted by FIG. 2D.

FIG. 2E depicts a second isometric view of header duct 100 in which an effective bend radius R is increased with the inclusion of bulbous region 130. As shown in FIG. 2E, bend radius R is a three-dimensional curve that extends laterally away from plane P3 while curving towards outlets 114a and 114b. Radius R is larger than a bend radius of duct 10 and, thus, contributes to reducing or eliminating a flow separation along an inside bend radius of bend 122 (e.g., flow separation region 27). Moreover, bulbous region 130 permits fluid flow bound for outlet 114a to turn more easily through bend 122, resulting in more uniform flow distribution through outlets 114a and 114b.

Discussion of Embodiments

The following are non-exclusive descriptions of possible embodiments of the present invention.

The header duct for supplying a fluid to one or more heat exchangers according to an exemplary embodiment of this disclosure, among other possible things includes an inlet portion having a planar inlet, an outlet portion having first and second planar outlets, and a transition portion extending from the inlet portion to the outlet portion that defines a bend such that first and second outlets are non-parallel to the inlet. The transition portion is continuous with the inlet and outlet portions and includes internal topography defining a non-monotonic cross-sectional area distribution between the inlet and outlet portions.

The header duct of the preceding paragraph can optionally include, additionally and/or alternatively, any one or more of the following features, configurations and/or additional components:

A further embodiment of the forgoing header duct can further include a first plane and a second plane that is parallel to and offset to the first plane in which the first plane contains a center point of the planar inlet that extends perpendicularly to the planar inlet and in which the second plane contains center points of the first and second outlets and extends parallel to a longitudinal dimension of the first and second outlets.

A further embodiment of any of the foregoing header ducts, wherein the internal topography can define a protrusion positioned between two depressions disposed on the inside corner of the bend adjacent the inlet portion.

A further embodiment of any of the foregoing header ducts that include a protrusion, wherein the protrusion can be defined by a convex curvature.

A further embodiment of any of the foregoing header ducts that include a protrusion, wherein the depressions can be defined by a concave curvature when viewed in a cross section intersecting the protrusion and extending perpendicularly to the planar inlet.

A further embodiment of any of the foregoing header ducts, wherein the internal topography can define an intermediate region with a larger cross-sectional area than a cross-sectional area of the planar inlet.

A further embodiment of any of the foregoing header ducts that include an intermediate region, wherein the cross-section of the intermediate region can be defined within a first intermediate plane intersecting the intermediate region that is parallel to and offset from the planar inlet.

A further embodiment of any of the foregoing header ducts that include an intermediate region having a cross-sectional area defined within the first intermediate plane, wherein the internal topography can define a convex curvature adjacent the inlet portion that transitions to a concave curvature along a second intermediate plane perpendicular to the first intermediate plane and intersecting the planar inlet.

A further embodiment of any of the foregoing header ducts that include an intermediate region, wherein the intermediate region can have a maximum lateral dimension that is coplanar with a center pointy of a cross-sectional area of the inlet that can be measured parallel to the planar inlet, the first planar outlet, and the second planar outlet.

A further embodiment of any of the foregoing header ducts, wherein the internal topography can define lateral walls that have a concave curvature that converge towards a lateral dimension of the first and second planar outlets.

A further embodiment of any of the foregoing header ducts that have an intermediate region with a cross-sectional area defined within the first intermediate plane and a curvature defined along the second intermediate plane, wherein the internal topography transitions from the concave curvature at the first intermediate plane to a second convex curvature in a direction extending away from the planar inlet along the second intermediate plane.

A further embodiment of any of the foregoing header ducts, wherein the internal topography can include a laterally-extending bulbous region that increases an effective radius of the bend within the transition portion.

A further embodiment of any of the foregoing header ducts, wherein walls of the inlet portion can diverge from the planar inlet to the transition portion.

A further embodiment of any of the foregoing header ducts that include a protrusion, wherein the protrusion can be a discrete component attached to the transition duct.

A method of forming a header duct for supplying a fluid to one or more heat exchangers according to an exemplary embodiment of this disclosure, among other possible steps includes: 1) forming an inlet portion that extends from a planar inlet, 2) forming an outlet portion with a plurality of planar outlets, 3) forming a transition portion joining the inlet portion to the outlet portion, and 4) forming a bulbous region defined by internal topography of the transition portion. The transition portion defines a non-monotonic cross-sectional area distribution that transitions from the inlet portion to the outlet portion. The bulbous region extends laterally away from a plane intersecting a center point of the inlet and extending perpendicularly away from the inlet along a longitudinal direction of the outlets.

The method of the preceding paragraph can optionally include, additionally and/or alternatively, any one or more of the following steps:

A further embodiment of the foregoing method can include forming a protrusion along an inside radius of a bend between the inlet portion and the outlet portion in which the bend defines an angle between the planar inlet and the planar outlets.

A further embodiment of any of the foregoing methods, wherein forming the outlet portion can further include offsetting the plurality of outlets in a lateral direction away from the plane.

A further embodiment of any of the foregoing methods, wherein forming the bulbous region can include forming lateral sides of the transition region that have a concave curvature that converges towards the plurality of outlets.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A header duct for supplying a fluid to one or more components, the header duct comprising:
an inlet portion having a planar inlet;
an outlet portion having first and second planar outlets that are non-parallel to the planar inlet; and
a transition portion extending from the inlet portion to the outlet portion and defining a bend, wherein the transition portion is continuous with the inlet portion and the outlet portion, and wherein the transition portion has an internal topography defining a non-monotonic cross-sectional area distribution between the inlet portion and the outlet portion, wherein the internal topography comprises:
a protrusion positioned between two depressions and disposed on the inside corner of the bend adjacent to the inlet portion, wherein the protrusion is defined by a convex curvature and the depressions are defined by a concave curvature when viewed in a cross section intersecting the protrusion and extending perpendicularly to the planar inlet, and wherein the protrusion is a discrete component attached to the transition duct; and
a laterally-extending bulbous region that increases an effective radius of the bend within the transition portion.

2. The header duct of claim 1, wherein a first plane contains a center point of the planar inlet and extends perpendicularly to the planar inlet, and wherein a second plane contains center points of the first and second planar outlets and extends perpendicularly to the first and second planar outlets, and wherein the first plane is parallel to and offset from the second plane.

3. The header duct of claim 2, wherein the planar inlet has a circular cross-sectional area, and wherein each of the first and second planar outlets has a rectangular cross-sectional area.

4. The header duct of claim 1, wherein the internal topography comprises:
lateral walls having a concave curvature that converge towards a lateral dimension of the first and second planar outlets; and
an intermediate region with a larger cross-sectional area than a cross-sectional area of the planar inlet, wherein:
the cross-sectional area of the intermediate region is defined within a first intermediate plane intersecting the intermediate region that is parallel to and offset from the planar inlet; and
the internal topography defines a convex curvature adjacent the inlet portion that smoothly transitions to a concave curvature along a second intermediate plane perpendicular to the first intermediate plane and intersecting the planar inlet.

5. The header duct of claim 4, wherein the intermediate region has a maximum lateral dimension that is coplanar with a center point of a cross-sectional area of the planar inlet, and wherein the maximum lateral dimension is measured parallel to the planar inlet, the first planar outlet, and the second planar outlet.

6. The header duct of claim 4, wherein the intermediate region of the internal topography transitions from the concave curvature at the first intermediate plane to a second convex curvature in a direction extending away from the planar inlet along the second intermediate plane.

7. The header duct of claim 1, wherein walls of the inlet portion diverge from the planar inlet to the transition portion.

* * * * *